Figure 1:
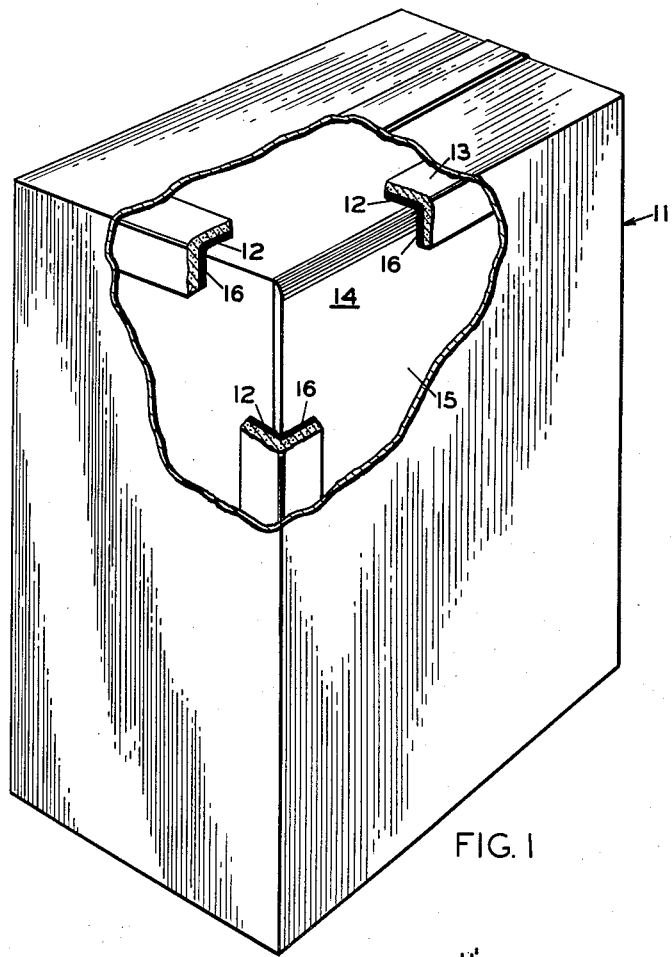

Feb. 27, 1962 E. R. MUELLER ET AL 3,022,885
ANTIMAR COATED ARTICLES
Filed March 11, 1957

INVENTOR.
ERNEST R. MUELLER
HERBERT N. JOHNSON
BY
Gray, Mase & Dunson
Attorneys

United States Patent Office 3,022,885
Patented Feb. 27, 1962

3,022,885
ANTIMAR COATED ARTICLES
Ernest R. Mueller and Herbert N. Johnston, Columbus, Ohio, assignors to Inland Container Corporation, Indianapolis, Ind., a corporation of Indiana
Filed Mar. 11, 1957, Ser. No. 645,012
16 Claims. (Cl. 206—46)

This invention relates to packages or shipping containers and parts thereof, for use in packing articles having highly finished or glossy surfaces subject to damage or marring by abrasion. More particularly, this invention relates to packages or shipping containers and parts thereof in which those surfaces contacting the packaged article are treated so as not to mar the highly finished surfaces of said articles packed therein. This invention also relates to packaging materials manufactured from paper, paperboard, fiber, wood, cloth, and similar materials commonly used in packaging and packing, having one or more surfaces treated or coated with an antimar coating.

Painted, varnished, lacquered, and other highly finished or glossy surfaces become marred when brought into rubbing contact with the surface of ordinary shipping containers and parts thereof, such as corrugated fibreboard, solid fibreboard, wood, etc. The fibers in the surface of such common fiber-containing packaging materials appear to abrade, scratch, or gouge the highly finished surface, thereby damaging and rendering the surface unsightly. Accordingly, highly finished articles are customarily packed only after necessary precautions have been taken to avoid damage to surfaces during shipment.

In order to prevent abrasive damage during shipment, many attempts have been made to reduce abrasiveness of the interior surface of shipping containers by application of special coatings. The purpose here was to provide a smooth surface on package interiors for contact with the highly finished surface of the packaged article. These special coatings (commonly made from materials such as paraffin wax) known to have good "slip" properties have disadvantages however, for they also mar the highly finished surfaces of the packaged article.

The coatings rub off on the surface of the article, and in the area of rub-off, cause an unsightly smudge or otherwise marred area on the surface of the article. This transfer of coating is not particularly objectionable in itself, provided that the transferred coating could be easily wiped off or removed from the highly finished surfaces of the packaged articles without a trace. However, due to the nature of such coatings, a greasy or oily smear which is very difficult to remove from the surface of the article without affecting the appearance of the highly finished surface, is deposited. In some instances, in fact, it would be necessary to repolish the entire surface of the article, in order to obtain an unblemished, highly finished surface without points or areas of high- and-low luster and gloss.

Because of these disadvantages, industry has often resorted to the practice of covering or encasing the article first in a soft paper covering or bag, or to use of various types of wadding, blankets, etc., before packaging the article in the shipping container. In addition, the article is securely packed within the container, so as to minimize relative motion between the article and the container. The use of a protective covering or protective wadding for the article is undesirable, since it increases the handling of the article itself, and involves considerable additional expense in the labor and materials required in the packaging operation.

This invention relates to a coating for the surface of the interior of shipping containers and parts thereof, the use of which coating overcomes the disadvantages of prior known coatings and eliminates the necessity for the use of protective coverings for the highly finished article. The coating has the desired "slip" properties and is capable of protecting the articles placed in contact with the coated fibreboard or other coated packing material from the abrasiveness of the uncoated surface. The coating provides a smooth surface and gives a minimum of rub-off onto highly finished surfaces placed in contact therewith. Although the coating material may transfer to the surface of the article which may be in contact with it, the coating can be easily wiped off the article without dulling or raising the luster of the surface of the article. In fact, it is oftentimes impossible to visually determine which part of the surface of the article had come into contact with the coating. Of equal importance to the properties of good "slip" characteristics, minimum rub-off and easy wipe-off, is the inertness of the coating material to the coating of the highly finished article. The antimar coating does not adversely affect the surface coating of the highly finished article, in that it does not have any softening, flatting, or blistering effect. Moreover, the coating materials of this invention may be chosen so that the coating remains solid over a wide range of temperatures, including even extremely elevated temperatures which occasionally may be encountered during storage or shipment.

Figure 2:
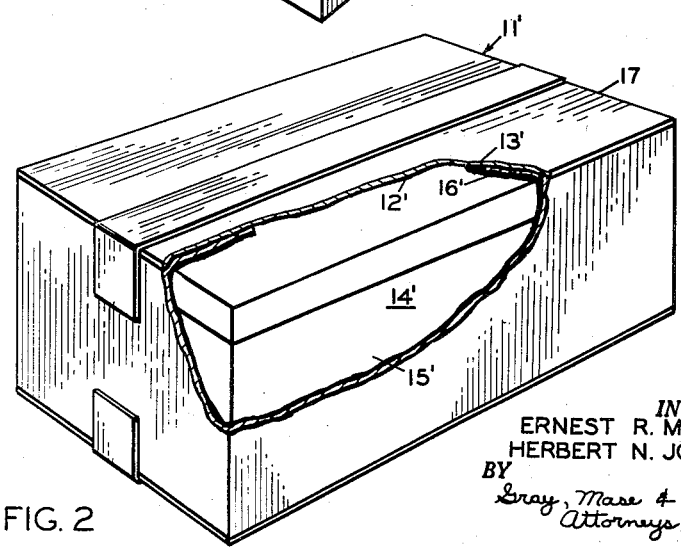

FIG. 1 is a perspective view of a preferred embodiment of the present invention, with portions cut away to show in cross section the protective barrier interface between the surface of the article and the inner container wall; and FIG. 2 is a similar view illustrating another preferred form of the invention.

Referring to FIG. 1, a package 11 comprises a coated surface 12 of a common packaging material 13 such as paper, paperboard, fiberboard, or wood. The coated surface 12 is in contact with a finished exterior surface 14 of a manufactured article 15 contained within the packaging material 13. The coating 16 on the coated surface 12 is a solid coating consisting essentially of fatty acids, and is characterized as removable by wiping in the event of transfer to the finished exterior surface 14 and as protecting the finished exterior 14 from marring.

Referring to FIG. 2, a package 11' contains a manufactured article 15' having a finished exterior surface 14' in contact with a coated interior surface 12' of a shipping container 17. The shipping container 17 is made of common fiber-containing packaging material 13', such as paper, paperboard, fiberboard, or wood. The coating 16' on the coated surface 12' is a solid coating consisting essentially of fatty acids, and is characterized as removable by wiping in the event of transfer to the finished exterior surface 14' and as protecting the finished exterior surface 14' from marring.

The above descriptions of the embodiments of the invention shown in FIGS. 1 and 2 may also be interchanged, adding primes to the reference numerals in the earlier paragraph when applying it to FIG. 2, and omitting the primes from the reference numerals in the later paragraph when applying it to FIG. 1.

The solid coating utilized in this invention is composed of fatty acids. The particular fatty acid or mixture of fatty acids to be utilized for the solid coating depends upon the range of temperatures to which the coated container shall be exposed. If the coated container is not going to be exposed to temperatures other than ordinary atmospheric temperature, for example, temperatures which do not exceed from about 85 to 95° F., the fatty acid used may be the saturated fatty acids containing not less than from 10 to 12 carbon atoms. Of course, it is practically impossible to control the uses to which the coated containers may be put. The containers may be exposed to southern climates where extremely high temperatures may be encountered in storage or shipment; for example, the temperature in a closed railroad box car in a southern climate may reach as high as from 125° to 140° F. during the summer months. In order that the coated containers may be suitable for use under such extremes of temperatures, it is preferable to use saturated fatty acids having at least 14 carbon atoms. Palmitic acid and stearic acid containing, respectively, 16 and 18 carbon atoms are ideally suited as the coating materials, because of their high melting points. The higher saturated fatty acids containing more than 18 carbon atoms may be used, but no particular apparent advantage is obtained with coatings of these fatty acids.

The coating may also be composed of mixtures of fatty acids, including minor amounts of low-melting-point saturated and unsaturated fatty acids. The melting-point range of the mixture of fatty acids should not be below the maximum temperature to which the coated container will be exposed. Fatty-acid mixtures consisting predominantly of palmitic and stearic acid, in about equal amounts, and a minor amount of oleic acid give highly satisfactory coatings. However, in such mixtures, the higher the content of the stearic acid, the better are the antimar properties of the coating with respect to saisfying the essential conditions of minimum rub-off and easy wipe-off.

The following examples will illustrate the invention. It is to be understood that these examples are merely illustrative of the invention, and are not to be considered in a limiting sense as restrictive of the scope of this invention. In each example, the fatty-acid coating material was melted and 3-mil draw-downs were made on the facing or liner of a sheet of corrugated paperboard. Draw-downs were made by pouring melted coating on paper and drawing it down by use of a metal bar. The percent of the fatty acids is given in percent by weight.

*Example I*

This coating consisted of a mixture of 90 percent stearic acid, 8 percent palmitic acid, and 2 percent oleic acid. This mixture of fatty acids had a melting point of about 150–156° F.

*Example II*

This coating consisted of a mixture of 75 percent stearic acid, 22 percent palmitic acid, and 3 percent oleic acid, and had a melting point of about 140–145° F.

*Example III*

This mixture of fatty acids is known as triplepressed stearic acid, and consisted of a mixture of 43 percent stearic acid, 54 percent palmitic acid, and 3 percent oleic acid. The melting point of this mixture was about 130–131° F.

*Example IV*

This mixture of fatty acids was double-pressed stearic acid, and consisted of a mixture of 42 percent stearic acid, 53 percent palmitic acid, and 5 percent oleic acid. The melting point of this mixture of fatty acids was from about 129 to 130° F.

*Example V*

The fatty-acid coating material of Example I was tested for its effect upon highly finished surfaces. Kraft liner used for facing corrugated board was coated with the coating material in the manner described for Example I. The coated facing liner was then taped against the various surfaces, with the coating in contact with the finished surfaces. The various finished surfaces included a painted office desk, a varnished wood chair, a painted filing cabinet, a baked automobile finish, copper metal, galvanized steel, tin plate, and a shingle finish. After about 21 days, the kraft facing liner was removed from the surface of the article and the article inspected for any effect upon the surface thereof. There was no softening, flatting, or blistering of any of the surfaces. There was no evidence of any chemical reaction between the finished surfaces and the fatty-acid coating. In the instances where there was a slight transfer of the coating from the facing liner to the surface tested, the coating composition was easily wiped away with a soft cloth, without evidence of having been on the surface of the article.

Reference has heretofore been made to the "slip" property of the fatty-acid coatings. The term "slip" is intended to designate the ability of the coatings to provide a smooth surface, against which highly finished surfaces may come in moving or rubbing contact under pressure without scratching or otherwise marring the highly finished surface. In order to have good "slip" properties, the coating must not be too hard, so that the coating itself will not be abrasive to the highly finished surface. At the same time, the coating must be such that it will not quickly rub off on to the highly finished surface during normal use. In addition to having the proper degree of hardness, the solid coatings of fatty acids, by coating or covering the fibers in the surface of fibreboard or other similar commonly used packing materials, reduce the abrasiveness of the surface coated.

The fatty-acid coatings may be applied to the surface of fibreboard, paper, lumber, etc., in any of the conventional manners known for applying coatings. The coating need not be more than a few mils thick. The fatty-acid coatings may be applied to localized areas of interior packing parts, cushions, buffers, etc., or to localized areas on the interior surface of the containers, with the localized areas of application corresponding to the areas where the highly finished surfaces of the article contact the interior surface of the container. In the case of corrugated board, for example, it is ordinarily preferred to apply the coating to the facing liner either before or after it is processed into board form. The coating operation can be easily and simply conducted by bringing the surface to be coated in contact with a roller, partially immersed in a hot melt of the fatty-acid coating material.

As various embodiments could be made in the invention described herein, and since many different changes can be made in the embodiments set forth, it is to be understood that all material disclosed is to be interpreted as illustrative and not in a limiting sense.

What is claimed is:

1. A package comprising a coated surface of a common packaging material such as paper, paperboard, fibreboard, and wood, the coated surface being in contact with a finished exterior surface of a manufactured article contained within said packaging material, the coating on said coated surface being a solid coating consisting essentially of fatty acids, said coating characterized as removable by wiping in the event of transfer to the finished exterior surface and as protecting the finished exterior surface from marring.

2. The package of claim 1 wherein said coated surface is on an interior packing part of a common packaging material.

3. The package of claim 1 further characterized by said solid coating being less than 0.005 inch thick.

4. The package of claim 1 further characterized by said solid coating having a melting point higher than 85° F.

5. The package of claim 1 further characterized by said solid coating consisting predominantly of fatty acids having at least 10 carbon atoms.

6. The package of claim 5 wherein said coated surface is on an interior packing part of a common packaging material.

7. The package of claim 5 further characterized by said solid coating consisting predominantly of stearic acid.

8. The package of claim 5 further characterized by said solid coating consisting predominantly of a mixture of equal parts of stearic acid and palmitic acid.

9. The package of claim 5 further characterized by said solid coating consisting predominantly of a mixture of equal parts of stearic acid and palmitic acid, and a minor amount of oleic acid.

10. A package containing a manufactured article having a finished exterior surface in contact with a coated interior surface of a shipping container, the shipping container being of common fiber-containing packaging materials, such as paper, paperboard, fiberboard, and wood, the coating on said coated surface being a solid coating consisting essentially of fatty acids, said coating characterized as removable by wiping in the event of transfer to the finished exterior surface and as protecting the finished exterior surface from marring.

11. A package according to claim 10, characterized by said solid coating being less than 0.005 inch thick.

12. A package according to claim 10, characterized by said solid coating having a melting point higher than about 85° F.

13. A package according to claim 10, characterized by said solid coating consisting predominantly of fatty acids having at least 10 carbon atoms.

14. A package according to claim 13, further characterized by said solid coating consisting predominantly of stearic acid.

15. A package according to claim 13, further characterized by said solid coating consisting predominantly of a mixture of equal parts of stearic acid and palmitic acid.

16. A package according to claim 13, further characterized by said solid coating consisting predominantly of a mixture of equal parts of stearic acid and palmitic acid, and a minor amount of oleic acid.

References Cited in the file of this patent

UNITED STATES PATENTS

| | | |
|---|---|---|
| 53,184 | Rand | Mar. 13, 1866 |
| 60,672 | Beck | Jan. 1, 1867 |
| 892,074 | Obici | June 30, 1908 |
| 2,015,864 | Muller et al. | Oct. 1, 1935 |
| 2,020,256 | Copeman | Nov. 5, 1935 |
| 2,158,524 | Reed | May 16, 1939 |
| 2,685,521 | Edgar | Aug. 3, 1954 |
| 2,712,384 | Corneil | July 5, 1955 |

FOREIGN PATENTS

| | | |
|---|---|---|
| 636,129 | Germany | Oct. 2, 1936 |